United States Patent
Ernst

(10) Patent No.: US 9,172,216 B2
(45) Date of Patent: Oct. 27, 2015

(54) PRECHAMBER SPARKPLUG

(75) Inventor: Anko Ernst, Salem (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 213 days.

(21) Appl. No.: 13/701,268

(22) PCT Filed: May 27, 2011

(86) PCT No.: PCT/EP2011/002620
§ 371 (c)(1),
(2), (4) Date: Nov. 30, 2012

(87) PCT Pub. No.: WO2011/151035
PCT Pub. Date: Dec. 8, 2011

(65) Prior Publication Data
US 2013/0099653 A1    Apr. 25, 2013

(30) Foreign Application Priority Data
Jun. 2, 2010 (DE) .......................... 10 2010 022 564

(51) Int. Cl.
*H01T 13/20* (2006.01)
*H01T 13/54* (2006.01)
*H01T 13/46* (2006.01)
*H01T 13/32* (2006.01)
*H01T 21/02* (2006.01)

(52) U.S. Cl.
CPC .............. *H01T 13/467* (2013.01); *H01T 13/32* (2013.01); *H01T 13/54* (2013.01); *H01T 21/02* (2013.01)

(58) Field of Classification Search
CPC ..................... H01T 21/02; H01T 13/00–13/60

USPC ................................................. 313/118–143
See application file for complete search history.

(56) References Cited

U.S. PATENT DOCUMENTS

| 1,596,240 | A | 8/1926 | Dikeman |
| 2,047,575 | A | 7/1936 | Burtnett |
| 2009/0107438 | A1* | 4/2009 | Baldwin et al. ......... 123/146.5 R |
| 2011/0148274 | A1* | 6/2011 | Ernst et al. .................... 313/141 |
| 2012/0299459 | A1* | 11/2012 | Sakakura et al. ............. 313/141 |

FOREIGN PATENT DOCUMENTS

| DE | 101 44 976 A1 | 4/2003 |
| FR | 768447 A | 8/1934 |

OTHER PUBLICATIONS

PCT International Search Report dated Sep. 12, 2011 for PCT/EP2011/002620.

* cited by examiner

*Primary Examiner* — Karabi Guharay
*Assistant Examiner* — Nathaniel Lee
(74) *Attorney, Agent, or Firm* — Fishman Stewart Yamaguchi PLLC

(57) ABSTRACT

A pre-chamber sparkplug is suggested with a central electrode, with at least one ground electrode, which is distanced from the central electrode forming a spark gap, and with at least one transfer bore in a pre-chamber cap. The ground electrode comprises an internal circumferential area, which faces the central electrode, and an external circumferential area, which faces away from the central electrode. The internal circumferential area of the ground electrode shows a concave progression in the longitudinal direction of the pre-chamber sparkplug, subjected to a tensile force, and the external circumferential area shows a convex progression in the longitudinal direction of the pre-chamber sparkplug, subjected to a pressure.

16 Claims, 2 Drawing Sheets

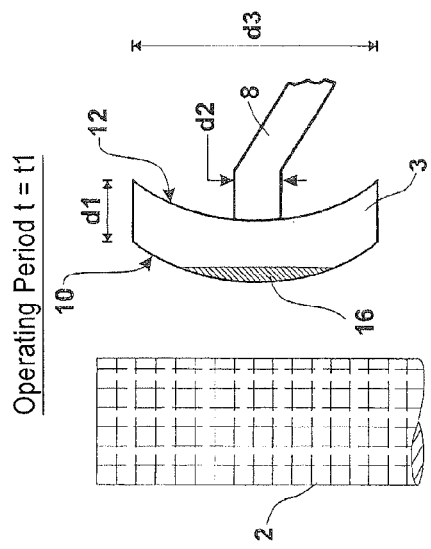
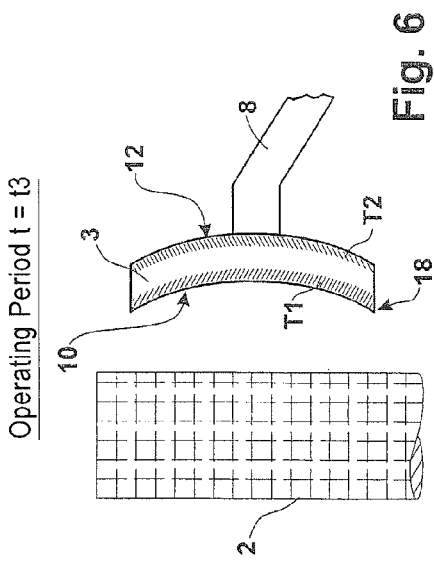
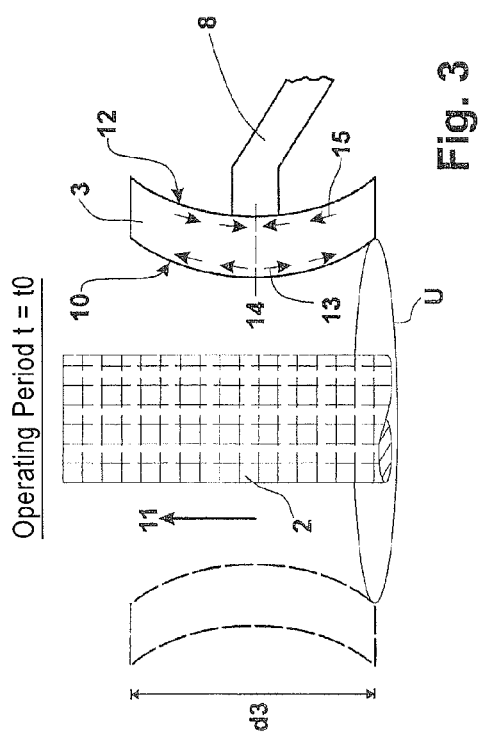
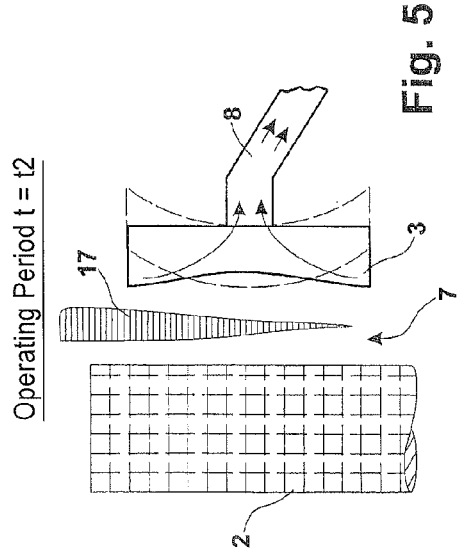

PRECHAMBER SPARKPLUG

CROSS REFERENCE TO RELATED APPLICATIONS

This application is a National Phase Application related to PCT/EP2011/002620 filed on May 27, 2011, which application claims priority to DE 10 2010 022 564.9 filed on Jun. 2, 2010, which applications are incorporated herein by reference in their entirety.

TECHNICAL FIELD

The disclosure relates to a pre-chamber sparkplug.

BACKGROUND

A pre-chamber sparkplug comprises, among other things, a central electrode and at least one ground electrode, which is arranged at a distance from the central electrode with the formation of a spark gap. The central and the ground electrode are arranged inside the pre-chamber cap. The compressed gas-air mixture flows into the pre-chamber via one or more transfer bores in the pre-chamber. After ignition, this mixture then spreads the flame front from the pre-chamber through these transfer bores into the main combustion chamber.

For example, a first embodiment DE 101 44 976 A1 shows a pre-chamber sparkplug with an annular ground electrode, which is fastened via fasteners at the pre-chamber cap. In the longitudinal direction of the pre-chamber the ground electrode shows an internal and an external circumferential area. The internal circumferential area faces the central electrode. The external circumferential area is arranged on the side of the ground electrode, which faces away from the central electrode. In a second embodiment several ground electrodes are arranged radially facing the central electrode. In both embodiments the central and the ground electrode are not accessible from the outside. Accordingly, both the volume burned off and the life span of the pre-chamber sparkplug is predetermined here. The volume burned off results from the minimal distance of the ground electrode from the central electrode in the new condition of the pre-chamber sparkplug as well as from the maximum distance and the shape of the ground electrode. Furthermore, the annular ground electrode cannot be adjusted, even if the pre-chamber were accessible. The life span of such a pre-chamber sparkplug typically amounts to approximately 2000 operating hours, so that here potentials are given for optimization.

Accordingly, there exists a need to further increase the life span of a pre-chamber sparkplug.

SUMMARY

In the pre-chamber sparkplug according to an exemplary arrangement of the disclosure, the internal circumferential area of the ground electrode has a concave progression, while the external circumferential area has a convex progression. Additionally, the internal circumferential area is subjected to tension and the external circumferential area to pressure. These stress forces are generated such that during the production process the ground electrode is inserted into the fastener and is compressed with the holder on the internal circumferential area as well as the external circumferential area, thus plastically deformed in a targeted fashion. Alternatively, tensile and pressure forces can be generated by welding the ground electrode to the fastener via a fillet weld.

During operation of the pre-chamber sparkplug, the thickness of the ground electrode reduces due to the burn-off. When a critical thickness of the ground electrode is fallen short of, the tensile and pressure forces cause the ground electrodes to return to the original state prior to the plastic deformation. Accordingly, by the tensile and pressure forces, a first compensation effect is yielded, which comprises that at an increased distance of the ground electrode from the central electrode the ground electrode automatically resets and thus the distance from the central electrode is shortened again. The first compensation effect ends when the circumferential areas of the central electrode and the ground electrode facing each other extend parallel in reference to each other. In experiments at the test station it was determined that the first compensation effect occurs after approximately 4000 operating hours.

The improved consistency in the formation of sparks is beneficial, caused by the distance between the electrodes being held constant. This in turn leads to a more constant combustion during the operating life of the pre-chamber sparkplug.

One embodiment of the disclosure provides that the transfer bore and/or the transfer bores is/are arranged such that the compressed gas-air mixture (central jet) flows through the spark gap between the central electrode and the ground electrode. A relatively strong heating of the ground electrode at the internal circumferential area with simultaneously good thermal dissipation to the external circumferential area is achieved via the fasteners in connection with the dimensioning of the ground electrode and the fastener. The temperature difference between the external and the internal circumferential area in turn causes the shape of the ground electrode to change. Now, the internal circumferential area shows a convex progression, while the external circumferential area shows a concave progression. By an appropriate arranging of the transfer bores in connection with the suitable sizing of the ground electrode and the fastener, a second compensation effect is achieved. This comprises that after an extended operating time of the pre-chamber sparkplug, the distance of the central electrode from the ground electrode is not enlarged, in spite of burn-off.

In the disclosure, the simple production method and a considerably extended life span are advantageous. The two compensation effects in turn offer the advantage of a more constant ignition time over the entire life span of the pre-chamber sparkplug.

BRIEF DESCRIPTION OF THE DRAWINGS

The figures illustrate the preferred exemplary embodiments. In the figures:

FIG. 3 shows a detail of FIG. 1 in its initial state,

FIG. 4 shows a detail after a first operating period,

FIG. 5 shows a detail after a second operating period, and

FIG. 6 shows a detail after a third operating period.

DETAILED DESCRIPTION

Figure 1:
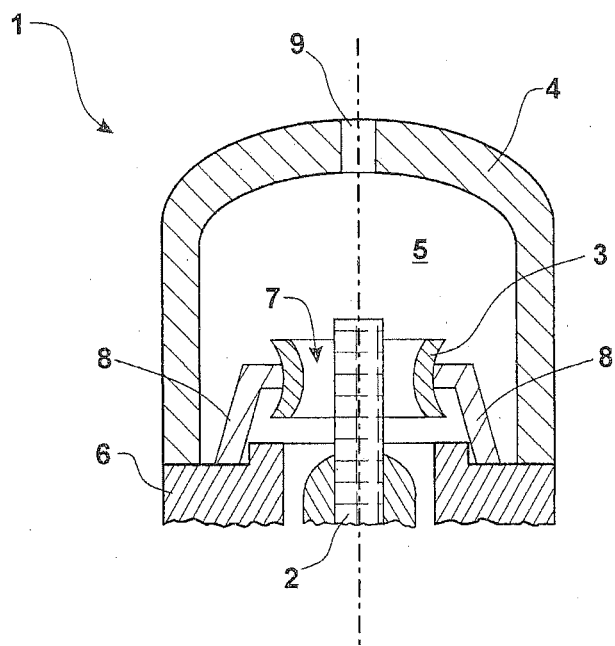
FIG. 1 shows a pre-chamber sparkplug with an annular ground electrode.

FIG. 1 shows a pre-chamber sparkplug 1 with an annular ground electrode 3 in the proximity of a pre-chamber 5, as a cross-section. The general design and the general function of a pre-chamber sparkplug are considered known per se. In the area of the pre-chamber 5, the pre-chamber sparkplug 1 comprises a central electrode 2, an annular ground electrode 3, a pre-chamber cap 4, which forms the pre-chamber 5, and a housing 6. The central electrode 2 is electrically isolated from the housing 6. The pre-chamber cap 4 is connected to the housing 6 of the pre-chamber sparkplug 1. At least one transfer bore 9 is provided in the pre-chamber cap 4, via which the gas-air mixture reaches the pre-chamber 5 and after whose ignition the flame front expands into the main combustion chamber. The central electrode 2 and the ground electrode 3 are arranged inside the pre-chamber 5, inaccessible from the outside. The ground electrode 3 surrounds the central electrode 2 at a distance, forming a spark gap 7. The ground electrode 3 is fastened at the housing 6 via the fastener 8.

Figure 2:
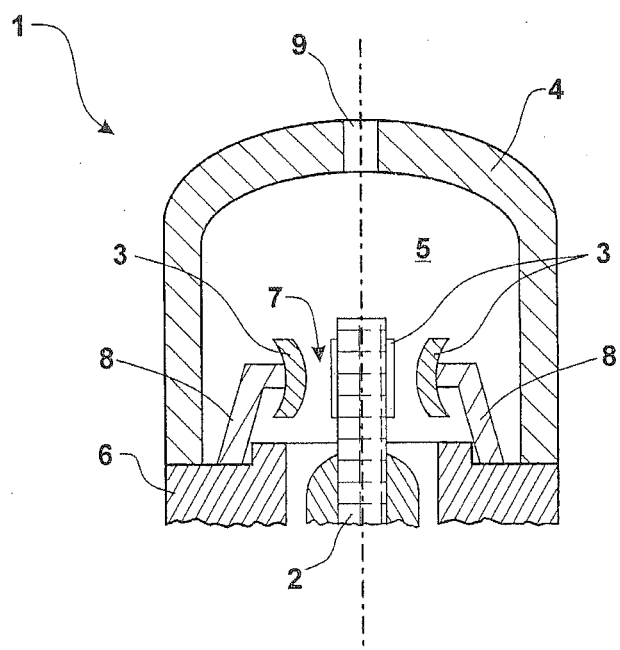
FIG. 2 shows a pre-chamber sparkplug with individual ground electrodes.

FIG. 2 shows a pre-chamber sparkplug 1 with individual ground electrodes 3. FIG. 2 discloses three ground electrodes 3, which are arranged radially in reference to the central electrode 2. Each ground electrode 3 is fastened via a fastener 8 at the housing 6 of the pre-chamber sparkplug 1.

FIGS. 3 through 6 are described jointly, showing a detail of FIG. 1 at different points in time during the operating period. Here, FIG. 3 shows the pre-chamber sparkplug 1 in its initial state, thus after an operating period t of zero operating hours (t=t0). FIG. 4 shows the pre-chamber sparkplug 1 after an operating term t1, e.g., 4000 operating hours. FIG. 5 shows the pre-chamber sparkplug 1 after an operating period t2, e.g., 5000 operating hours, and FIG. 6 shows the pre-chamber sparkplug 1 after an operating period t3, e.g., 6000 operating hours.

According to FIG. 3, the ground electrode 3 shows an internal circumferential area 10, which faces the central electrode 2. The internal circumferential area 10 is formed from a circumference U and a height d3. As shown, the internal circumferential area 10 extends therefore in the longitudinal direction 11 of the pre-chamber sparkplug 1. An external circumferential area 12 of the ground electrode 3 is located at the side of the ground electrode 3, which faces away from the central electrode 2. In the initial state, the internal circumferential area 10 shows a concave progression, while the external circumferential area 12 shows a convex progression. The two curved circumferential areas are produced by the ground electrode 3 being inserted at the external circumferential area 12 into the fastener 8, and then the internal circumferential area 10 and the external circumferential area 12 being simultaneously compressed against the fastener 8, thus being plastically deformed in a targeted fashion. By the plastic deformation, tensile force 13 is generated in the internal circumferential area 10, which starts at an origin of tension 14. Pressures 15 are generated in the external circumferential area 12, though, which mutually compensate each other in the origin of tension 14. In an alternative production method, the two curved circumferential areas as well as the tensions and pressures are generated by the ground electrode 3 being welded via a fillet weld to the fastener 8.

As shown in FIG. 4, the ground electrode 3 is already burned off on the internal circumferential area 10 in an area 16 shown hatched. This status occurs at the point in time t1. By the burn-off, the thickness d1 of the ground electrode 3 reduces. A first compensation effect occurs if the thickness of the ground electrode 3 is smaller than a critical thickness. Caused by insufficient thickness, the tensile force 13 upon the internal circumferential area 10 and the pressure 15 upon the external circumferential area 12 cause a resetting of the ground electrode 3 into its initial form prior to the plastic deformation. The first compensation effect therefore comprises that in an increasing distance of the two electrodes, the ground electrode 3 automatically resets and, in this way, the distance from the central electrode 2 is reduced again. The first compensation effect then ends when the internal circumferential area 10 of the ground electrode 3 and the circumferential area of the central electrode 2 extend parallel in reference to each other. This status is shown in FIG. 5, with the status shown in dot-dash lines being equivalent to the illustration of FIG. 4.

In order to extend the life span of the pre-chamber sparkplug 1, the disclosure provides for the transfer bores 9 in the pre-chamber cap 5 being arranged and aligned such that the compressed mixture 17 (central jet) flows through the spark gap 7 between the central electrode 2 and the ground electrode 3. Due to the fact that the compressed mixture shows a temperature of approximately 200° C., the internal circumferential area 10 of the ground electrode 3 is heated. Via the fasteners 8, heat conduction develops from the ground electrode 3 to the housing 6. In FIG. 5, the thermal flow is indicated by respective arrows. By sizing the ground electrode 3 and the fastener 8 in reference to each other, the effect can be yielded that the ground electrode 3 strongly heats up at the internal circumferential area 10, and the ground electrode 3 heats up to a lesser extent at the external circumferential area 12. It has shown in experiments at the test station that the effect occurs in a reproducible fashion when the ratio $d2/d1 > 1.846$ and the ratio $d3/d2 > 1.35$. Here, d1 is equivalent to the thickness of the ground electrode 3, d2 to the thickness of the fastener 8, and d3 to the height of the ground electrode 3. See FIG. 4.

The temperature difference between the internal and the external circumferential area in turn now causes the internal circumferential area 10 of the ground electrode 3 to assume a convex progression, and the external circumferential area 12 a concave progression. This status is shown in FIG. 6. The reference character T1 marks the temperature at the internal circumferential area 10, and T2 the temperature at the external circumferential area 12 of the ground electrode 3, where the temperature T1 is greater than the temperature T2 ($T2 > T1$). By the alignment of the transfer bores 9 and the sizing of the ground electrode 3 and the fastener 8, a second compensation effect is achieved. FIG. 6 shows the pre-chamber sparkplug after the second compensation effect at an operating period t equivalent to t3.

The burn-off continues in the area of the external edges 18 of the ground electrode 3 and leads to a rounding of the edges 18 of the ground electrode 3. During the further operation the burn-off continues in a direction towards the central axis of the ground electrode. Consequently, the internal circumferential area 10 once more forms parallel in reference to the central electrode 2. The starting point is reached once more. This burn-off behavior continues until a critical diameter is reached in the area of the central axis of the ground electrode 3, and the ground electrode 3 collapses and the minimum electrode distance is fallen short of or the ground electrode 3 falls out of the fastening.

What is claimed is:

1. A pre-chamber sparkplug comprising: a central electrode, with at least one ground electrode, which is distanced from the central electrode so as to form a spark gap, and at least one transfer bore in a pre-chamber cap, with the ground electrode comprising an internal circumferential area, which faces the central electrode, and an external circumferential area, which faces away from the central electrode, wherein the internal circumferential area has a concave progression in the longitudinal direction of the pre-chamber sparkplug, being subjected to a tensile force, and the external circumferential area having a convex progression in the longitudinal direction of the pre-chamber sparkplug, being subjected to a pressure.

2. A pre-chamber sparkplug according to claim 1, wherein the ground electrode is fastened via fasteners at a housing of the pre-chamber sparkplug.

3. A pre-chamber sparkplug according to claim 2, wherein at least one transfer bore is arranged such that a compressed mixture flows through the spark gap between the central electrode and the ground electrode.

4. A pre-chamber sparkplug according to claim 1, wherein the at least one ground electrode includes a plurality of electrodes arranged radially in reference to the central electrode.

5. A method for producing a pre-chamber sparkplug, the pre-chamber sparkplug comprising a central electrode and at least one ground electrode distanced from the central electrode to form a spark gap, and a pre-chamber cap defining at least one transfer bore, with the ground electrode comprising an internal circumferential area facing the central electrode, and an external circumferential area facing away from the central electrode, wherein the internal circumferential area has a concave progression in the longitudinal direction of the pre-chamber sparkplug, and the external circumferential area has a convex progression in the longitudinal direction of the pre-chamber sparkplug, the method comprising:
    inserting the ground electrode into a fastener, thereby contacting the external circumferential area of the ground electrode with the fastener,
    compressing the ground electrode to create a pressure against the fastener on the external circumferential area, and to a tensile force in the internal circumferential area, and
    securing the ground electrode and the fastener to a housing of the pre-chamber sparkplug.

6. The method according to claim 5, further comprising welding the external circumferential area of the ground electrode via a fillet weld to the fastener.

7. The method of claim 5, further comprising welding the ground electrode to the fastener.

8. The method of claim 5, further comprising plastically deforming the ground electrode.

9. A pre-chamber sparkplug, comprising:
    a pre-chamber cap defining at least one transfer bore, a central electrode; and
    at least one ground electrode, the at least one ground electrode spaced from the central electrode to define a spark gap, the ground electrode defining an internal circumferential area facing the central electrode and an external circumferential area facing away from the central electrode, the internal circumferential area being concave in the longitudinal direction of the pre-chamber sparkplug, and the external circumferential area being convex in the longitudinal direction of the pre-chamber sparkplug.

10. A pre-chamber sparkplug according to claim 9, wherein the internal circumferential area is in tension.

11. A pre-chamber sparkplug according to claim 10, wherein the external circumferential area is in compression.

12. A pre-chamber sparkplug according to claim 9, wherein the external circumferential area is in compression.

13. A pre-chamber sparkplug according to claim 9, wherein the at least one ground electrode and central electrode are positioned such that the spark gap widens in a longitudinally central portion of the ground electrode.

14. A pre-chamber sparkplug according to claim 9, wherein the at least one ground electrode and central electrode are positioned such that spark gap narrows in at least one longitudinal end portion of the ground electrode.

15. A pre-chamber sparkplug according to claim 9, further comprising a housing, wherein the ground electrode is fastened to the housing.

16. A pre-chamber sparkplug according to claim 9, wherein the ground electrode is fastened to the housing via a fastener.

* * * * *